(12) United States Patent
Scheu

(10) Patent No.: US 8,621,965 B2
(45) Date of Patent: Jan. 7, 2014

(54) FACE DRIVER

(75) Inventor: Rudolf Scheu, Baechingen (DE)

(73) Assignee: Roehm GmbH, Sontheim (DE)

( * ) Notice: Subject to any disclaimer, the term of this patent is extended or adjusted under 35 U.S.C. 154(b) by 114 days.

(21) Appl. No.: 13/278,632

(22) Filed: Oct. 21, 2011

(65) Prior Publication Data
US 2012/0097000 A1 Apr. 26, 2012

(30) Foreign Application Priority Data

Oct. 22, 2010 (DE) .......................... 10 2010 060 118

(51) Int. Cl.
*B23B 23/00* (2006.01)
(52) U.S. Cl.
USPC .......................................................... 82/165
(58) Field of Classification Search
USPC ..................................... 82/165, 148, 166, 167
See application file for complete search history.

(56) References Cited

U.S. PATENT DOCUMENTS

| 1,361,120 | A | * | 12/1920 | Weatherby | 82/165 |
| 2,653,503 | A | * | 9/1953 | Cormier | 82/148 |
| 2,897,708 | A | * | 8/1959 | Kostyrka | 82/150 |
| 2,948,540 | A | * | 8/1960 | Garberding et al. | 279/4.12 |
| 3,311,006 | A | | 3/1967 | Seitter | |
| 3,518,904 | A | * | 7/1970 | Rohm | 82/150 |
| 4,677,885 | A | * | 7/1987 | Schmid et al. | 82/165 |
| 5,243,885 | A | * | 9/1993 | Lash | 82/165 |
| 5,771,762 | A | * | 6/1998 | Bissett | 82/1.11 |
| 6,374,713 | B1 | * | 4/2002 | Bissett | 82/150 |
| 6,647,841 | B2 | | 11/2003 | Faden et al. | |
| 2012/0097000 | A1 | | 4/2012 | Scheu | |

FOREIGN PATENT DOCUMENTS

| DE | 1703830 | U | 8/1955 |
| DE | 1040879 | B | 10/1958 |
| DE | 1080834 | B | 10/1960 |
| DE | 1128255 | B | 6/1962 |
| DE | 1602792 | A1 | 8/1970 |
| DE | 19534073 | A1 | 3/1997 |
| GB | 725439 | A | 3/1955 |
| JP | 57083307 | A * | 5/1982 |
| WO | WO 9504623 | A1 | 2/1995 |

* cited by examiner

*Primary Examiner* — Daniel Howell
*Assistant Examiner* — Nicole N Ramos
(74) *Attorney, Agent, or Firm* — Andrew Wilford

(57) ABSTRACT

A face driver has a body rotatable about an axis and a head rotationally fixed on the body and formed with a plurality of guides open axially forwardly toward a workpiece and radially offset from the axis. A centering rod axially shiftable in the body on the axis has a front-end point engageable with the face of the workpiece. A compression spring in the body urging the rod axially forward toward the workpiece, a driver disk has a front face engageable with the workpiece and a back face formed with a plurality of rearwardly open and radially extending grooves aligned with the guides. Respective support pins axially shiftable in the guides have heads engaged in the respective grooves so as to rotationally couple the driver disk rotationally to the body while permitting the driverd disk to tip with axial displacement of the pins.

5 Claims, 2 Drawing Sheets

FACE DRIVER

FIELD OF THE INVENTION

The present invention relates to a face driver. More particularly this invention concerns such driver used in a lathe or the like for transmitting torque to an end face of a workpiece.

BACKGROUND OF THE INVENTION

A standard face driver has a body in which a compression spring is directly or indirectly braced against a centering rod having a centering point, and having a driver disk that surrounds the centering rod and serves for contacting the workpiece. Such a face drivers is used in cooperation with a tailstock to hold workpieces at their end faces when it is not possible to hold them on their side or peripheral surfaces, for example because that is where machining is to be done. As a result of the holding at the end faces, torque must be transmitted via the end faces of the workpiece, and in addition forces that act during axial and radial machining must not be allowed to interfere with the holding and the position of the workpiece.

A face driver of the above-described type is described in U.S. Pat. No. 6,647,841 in which a spacer disk on the one hand and a swash plate on the other hand are provided between the body and the workpiece, the spacer disk and the swash plate each being supported by steel rollers that are aligned orthogonally with respect to one another.

In addition, a face driver from Basile GmbH is known from prior public use where a compensating system is used that, with the aid of wedge levers, allows driving by four drive pins. The wedge lever body is held in the correct position by two wedge lever pins that are supported by two wedge lever supports. Two floating plates are situated on the wedge lever body, and are held in position on the wedge lever body by two elastic elements. The four driving pins are guided by the driving pin head. The centering point is independent from the driving pin, and is tensioned by a disk spring assembly. For left/right rotation there is an option to exchange the driving pins.

OBJECTS OF THE INVENTION

It is therefore an object of the present invention to provide an improved face driver.

Another object is the provision of such an improved face driver that overcomes the above-given disadvantages, in particular that can be used with a workpiece whose end face is not perpendicular to the axis about which it is to be rotated for machining and where rotation direction can be changed.

A further object is to provide a face driver that may be integrated into the existing design of conventional face drivers, while at the same time reducing the difficulty of operation and maintenance.

SUMMARY OF THE INVENTION

A face driver engageable with an end face of a workpiece has according to the invention a body rotatable about an axis and a head rotationally fixed on the body and formed with a plurality of guides open axially forwardly toward the workpiece and radially offset from the axis. A centering rod axially shiftable in the body on the axis has a front-end point engageable with the face of the workpiece. A compression spring in the body urging the rod axially forward toward the workpiece, a driver disk surrounds the centering rod and has a front face turned axially toward and engageable with the workpiece and a back face turned axially toward the body and formed with a plurality of rearwardly open and radially extending grooves aligned with the guides. Respective support pins axially shiftable in the guides have front-end heads engaged in the respective grooves so as to rotationally couple the driver disk rotationally to the body while permitting the driver disk to tip with axial displacement of the pins.

The face driver according to the invention is characterized by a very simple design in which the torque may be transmitted from the body coupled to the work spindle of the lathe, to the driver disk by the support pins that engage in the grooves of the driver disk, and as a result of the axial displaceability of the support pins the driver disk may be carried along in an oscillating manner; i.e., the driver disk may be adapted to inclined workpiece surfaces without impairing the holding or transmission of torque to the workpiece at its end face. The driver disk may have teeth on its front side facing the workpiece, although the invention may also be implemented using any other known variant for the contact between the end face of the workpiece and the driver disk.

Within the scope of the invention, it is particularly preferred that the support pins are braced against a compensating disk at their back ends facing away from the driver disk, since in this manner the axial displaceability of the support pins is coupled together, and compensation via the support pins acting on the driver disk is achieved when the driver disk contacts the end face of the workpiece.

It is also advantageous when at least three support pins are provided, and the compensating disk is spherically swivelable on the body on a bearing. This design provides a three-point bearing in which the ends of the support pin facing the driver disk are appropriately aligned via the spherical swiveling of the compensating disk on the body. Alternatively, inclined surfaces that are associated with the support pins may be provided on the compensating disk, by means of which the a planar face of the compensating disk is radially displaced on the body in a compensating manner.

According to the invention, the grooves have V-forming bevels for cooperating with the associated centering heads, thus in particular facilitating play-free cooperation of the support pins with the driver disk, and especially changing between right and left rotational directions without interfering with the oscillating drive. The cooperation of the three-point bearing and the guiding of the support pins in the V-forming bevels of the grooves prevents the driver disk from twisting, regardless of the direction of torque and the oscillating function.

To further facilitate cooperation of the support pins with the grooves in the driver disk, the centering heads have part-spherical front ends, so that the support pins are able to align in the V-forming bevels in the grooves via the spherical front ends, and to maintain this alignment regardless of the rotational direction of the work spindle. Within the scope of the invention, it is further provided that the centering rod extends through a central passage in the compensating disk; i.e. the compensating disk is on the centering rod and in this respect can swivel without slipping radially.

BRIEF DESCRIPTION OF THE DRAWING

The above and other objects, features, and advantages will become more readily apparent from the following description, reference being made to the accompanying drawing in which.

DETAILED DESCRIPTION

Figure 1:
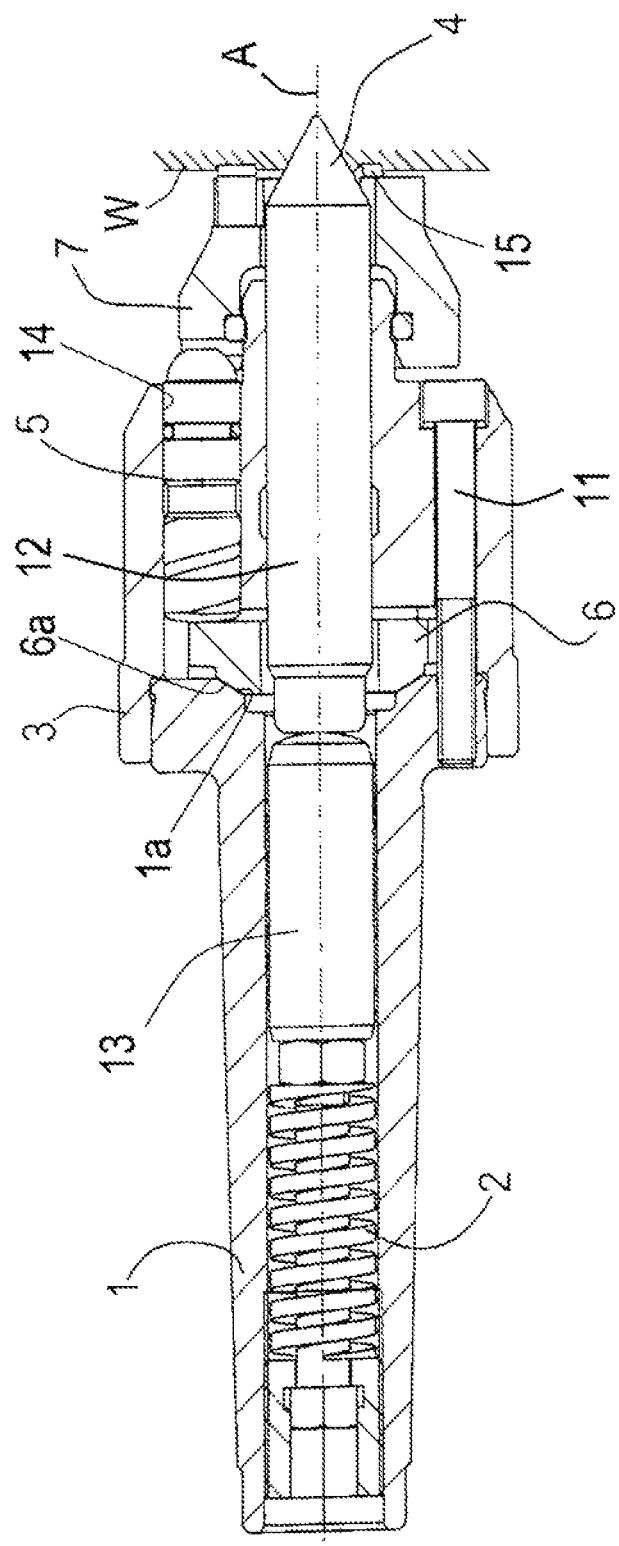
FIG. 1 is a longitudinal section through a face driver according to the invention.
Figure 2A:
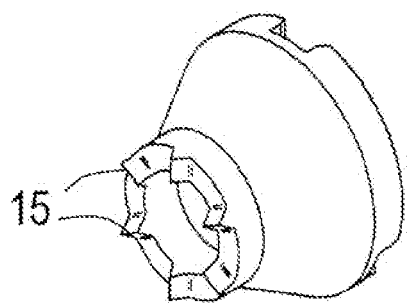
FIGS. 2A and 2B are perspective views of the driver disk from different angles.
Figure 2B:
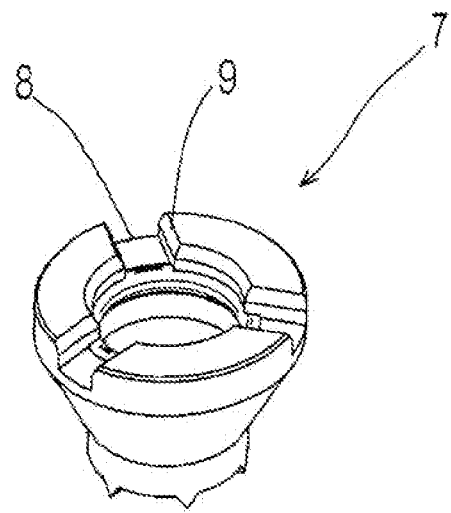
Figure 3:
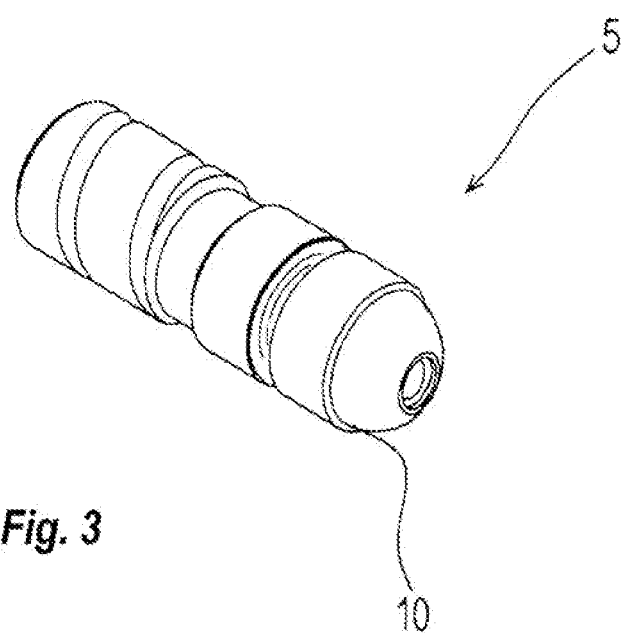
FIG. 3 is a perspective view of one of the support pins.

As seen in FIG. a face driver has a metallic body 1 centered on an axis and formed at its rear region with an external Morse taper for coupling to the work spindle of a lathe or the like. A compression spring 2 bears indirectly via a pusher rod 13 on a centering rod 12 having a point 4 fitted in an axially centered passage of the body 1 and the pressure it exerts is applied as a variable centering force to the point 4 that can dig into a workpiece shown schematically at W. The face driver also has an annular driver disk 7 that coaxially surrounds the centering rod 12 and can contact the workpiece W, as well as a driver head 3 in which a plurality of support pins 5 are axially slidable in respective guides 14 extending parallel to but offset radially from the center axis A. The driver head 3 is rotationally and axially fixed to the body 1 by angularly equispaced screws 11 that pass through the driver head 3 and engage in respective threaded holes in the body 1. Each support pin 5 has a centering head 10 having a spherical centering surface that engages in a respective radial groove 8 in the driver disk 7, the grooves 8 each having V-forming bevels 9 for fitting with the associated centering head 10.

In the embodiment illustrated in the drawing, the support pins 5 are braced against a compensating disk 6 at their rear ends facing away from the driver disk 7. The compensating disk 6 and the body 1 having complementary part-spherical surfaces to that the disk 6 can swivel on the body 1 about a point on the axis A. The embodiment shown in the drawing has three pins 5 that ensure three-point support of the driver disk 7. The centering rod 12 extends through a central hole of the compensating disk 6.

The face driver according to the invention allows the corotating driver disk 7 to contact the workpiece W with its front face turned toward the workpiece W, even if the face of the workpiece W is at an angle to a plane perpendicular to the axis ! of the work spindle and of the face driver when the workpiece is mounted on a tailstock. The driver disk 7 bears with teeth 15 that dig into the end face of the workpiece, and via the compensating disk 6 displaces the support pins 5 in the guides 14 in a compensating manner. At the same time, the support pins 5 press the spherical front ends of the centering heads 10 into the grooves 8 having the V-forming bevels 9, so that the driver disk 7 is carried along in a play-free, oscillating manner.

I claim:

1. A face driver engageable with an end face of a workpiece, the face driver comprising:
   a body rotatable about an axis;
   a head rotationally fixed on the body and formed with a plurality of guides open axially forwardly toward the workpiece and radially offset from the axis;
   a centering rod axially shiftable in the body on the axis and having a front-end point engageable with the end face of the workpiece;
   a compression spring in the body urging the rod axially forward toward the workpiece;
   a driver disk surrounding the centering rod and having a front face turned axially toward and engageable with the workpiece and a back face turned axially toward the body and formed with a plurality of rearwardly open and radially extending grooves aligned with the guides and each having V-forming bevels;
   respective support pins axially shiftable in the guides and having rounded front-end heads engaged in the bevels of the respective grooves so as to rotationally couple the driver disk rotationally to the body while permitting the driver disk to swivel with axial displacement of the pins;
   a swivelable support disk rearwardly supported on the body and bearing axially forward on rear ends of the support pins; and
   complementary part-spherical bearing surfaces on the support disk and body, engaging each other, and centered on the axis for swiveling of the support disk on the body.

2. The face driver defined in claim 1 wherein the support disk is annular and surrounds the centering rod.

3. The face driver defined in claim 1 wherein the driver disk has a front face having formations adapted to dig axially into the end face of the workpiece for angular force transmission between the disk and the workpiece.

4. The face driver defined in claim 3 wherein the formations are teeth.

5. The face driver defined in claim 1 wherein the guides are angularly equispaced about the body and there are at least three of the guides.

* * * * *